(12) United States Patent
Watson et al.

(10) Patent No.: US 8,781,220 B1
(45) Date of Patent: Jul. 15, 2014

(54) INTENSITY BASED PIXEL QUANTIZATION

(71) Applicant: Marvell International Ltd., Hamilton (BM)

(72) Inventors: Brian S. Watson, Dallas, OR (US); Jay McDougal, Corvallis, OR (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/954,820

(22) Filed: Jul. 30, 2013

Related U.S. Application Data

(63) Continuation of application No. 13/155,226, filed on Jun. 7, 2011, now Pat. No. 8,509,527.

(60) Provisional application No. 61/413,226, filed on Nov. 12, 2010, provisional application No. 61/357,874, filed on Jun. 23, 2010.

(51) Int. Cl.
G06K 9/00 (2006.01)

(52) U.S. Cl.
USPC .......................................... 382/162

(58) Field of Classification Search
USPC .................. 382/162, 166, 232, 251
See application file for complete search history.

(56) References Cited

U.S. PATENT DOCUMENTS

| | | |
|---|---|---|
| 5,818,975 A | 10/1998 | Goodwin et al. |
| 6,115,104 A | 9/2000 | Nakatsuka |
| 7,006,668 B2 | 2/2006 | Iguchi et al. |
| 7,072,523 B2 | 7/2006 | Bolle et al. |
| 7,146,059 B1 | 12/2006 | Durand et al. |
| 7,280,705 B1 | 10/2007 | Frank et al. |
| 7,539,342 B2 | 5/2009 | Tabata et al. |
| 7,738,727 B2 | 6/2010 | Chang et al. |
| 7,756,408 B2 | 7/2010 | Ito et al. |
| 7,830,566 B2 | 11/2010 | Yamada et al. |
| 7,969,456 B2 | 6/2011 | Brown Elliott et al. |
| 7,999,858 B2 | 8/2011 | Nayar et al. |
| 2001/0007599 A1 | 7/2001 | Iguchi et al. |
| 2002/0080247 A1 | 6/2002 | Takahashi et al. |
| 2002/0135743 A1 | 9/2002 | Gindele |
| 2003/0048362 A1 | 3/2003 | Watanabe et al. |
| 2005/0100242 A1 | 5/2005 | Trifonov et al. |
| 2005/0169533 A1 | 8/2005 | Paragyios |
| 2005/0243347 A1 | 11/2005 | Hayaishi |
| 2007/0032886 A1 | 2/2007 | Tsai |
| 2007/0206939 A1 | 9/2007 | Ito et al. |
| 2007/0223814 A1 | 9/2007 | Chang et al. |

Primary Examiner — Duy M Dang

(57) ABSTRACT

Embodiments of the present disclosure provide a method comprising accessing a first pixel that is neighboring to a second pixel of an image, the first pixel including a plurality of color fields, each color field of the plurality of color fields associated with a respective color plane, wherein the second pixel is to be processed as a target pixel; quantizing the plurality of color fields to generate a corresponding plurality of quantized color fields, wherein said quantizing the plurality of color fields is based on a contribution of individual color planes of the plurality of color planes towards an intensity of the image; and processing the target pixel based at least in part on the plurality of quantized color fields. Other embodiments are also described and claimed.

20 Claims, 4 Drawing Sheets

INTENSITY BASED PIXEL QUANTIZATION

CROSS REFERENCE TO RELATED APPLICATIONS

The present disclosure is a continuation of and claims priority to U.S. patent application Ser. No. 13/155,226, filed Jun. 7, 2011, now U.S. Pat. No. 8,509,527, issued Aug. 13, 2013, which claims priority to U.S. Provisional Patent Application No. 61/413,226, filed Nov. 12, 2010, and U.S. Provisional Patent Application No. 61/357,874, filed Jun. 23, 2010, which are incorporated herein by reference.

TECHNICAL FIELD

Embodiments of the present disclosure relate to the field of pixel quantization, and more particularly, to intensity based pixel quantization.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

In various image processing applications, while processing a pixel in an image, a plurality of neighboring pixels are accessed. For example, for image enhancement of a pixel, an image processing application requires a window of neighboring pixels.

Generally, a plurality of lines of pixels is stored as line rasters in an internal memory of an image processing chip (or to any other appropriate memory), from which various neighboring pixels are accessed while processing the pixel. The stored line rasters generally require significant storage area in the internal memory.

SUMMARY

In accordance with various embodiments of the present disclosure, there is provided a method comprising accessing a first pixel that is neighboring to a second pixel of an image, the first pixel including a plurality of color fields, each color field of the plurality of color fields associated with a respective color plane, wherein the second pixel is to be processed as a target pixel; quantizing the plurality of color fields to generate a corresponding plurality of quantized color fields, wherein said quantizing the plurality of color fields is based on a contribution of individual color planes of the plurality of color planes towards an intensity of the image; and processing the target pixel based at least in part on the plurality of quantized color fields.

In various embodiments, there is also provided a system-on-chip (SOC) comprising a pixel window control module configured to form a pixel window around a target pixel of an image, the pixel window comprising a plurality of neighboring pixels including a pixel, the pixel including a plurality of color fields, each color field associated with corresponding color plane; a quantization module configured to determine that the plurality of color fields are not quantized, and based on determining that the plurality of color fields are not quantized, quantize the plurality of color fields to generate a corresponding plurality of quantized color fields, wherein said quantizing the plurality of color fields is based on a contribution of individual color planes of the plurality of color planes towards an intensity of the image; and a target pixel processing module configured to process the target pixel based at least in part on the plurality of quantized color fields.

In various embodiments, there is also provided a method comprising forming a pixel window around a pixel of an image, the pixel window comprising a plurality of neighboring pixels of the pixel, each neighboring pixel of the plurality of neighboring pixels comprising a plurality of color fields, each color field associated with a corresponding color plane; for each of one or more neighboring pixels of the plurality of neighboring pixels, quantizing the plurality of color fields to generate a corresponding plurality of quantized color fields based on a contribution of individual color planes of the plurality of color planes towards an intensity of the image; and processing the pixel based at least in part on the plurality of quantized color fields of the one or more neighboring pixels.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments of the disclosure are illustrated by way of example and not by way of limitation in the figures of the accompanying drawings.

DETAILED DESCRIPTION OF EMBODIMENTS OF THE DISCLOSURE

Embodiments of the present disclosure describe configurations of various components of a laser printing device architecture and associated techniques. In the following detailed description, reference is made to the accompanying drawings which form a part hereof wherein like numerals designate like parts throughout, and in which is shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
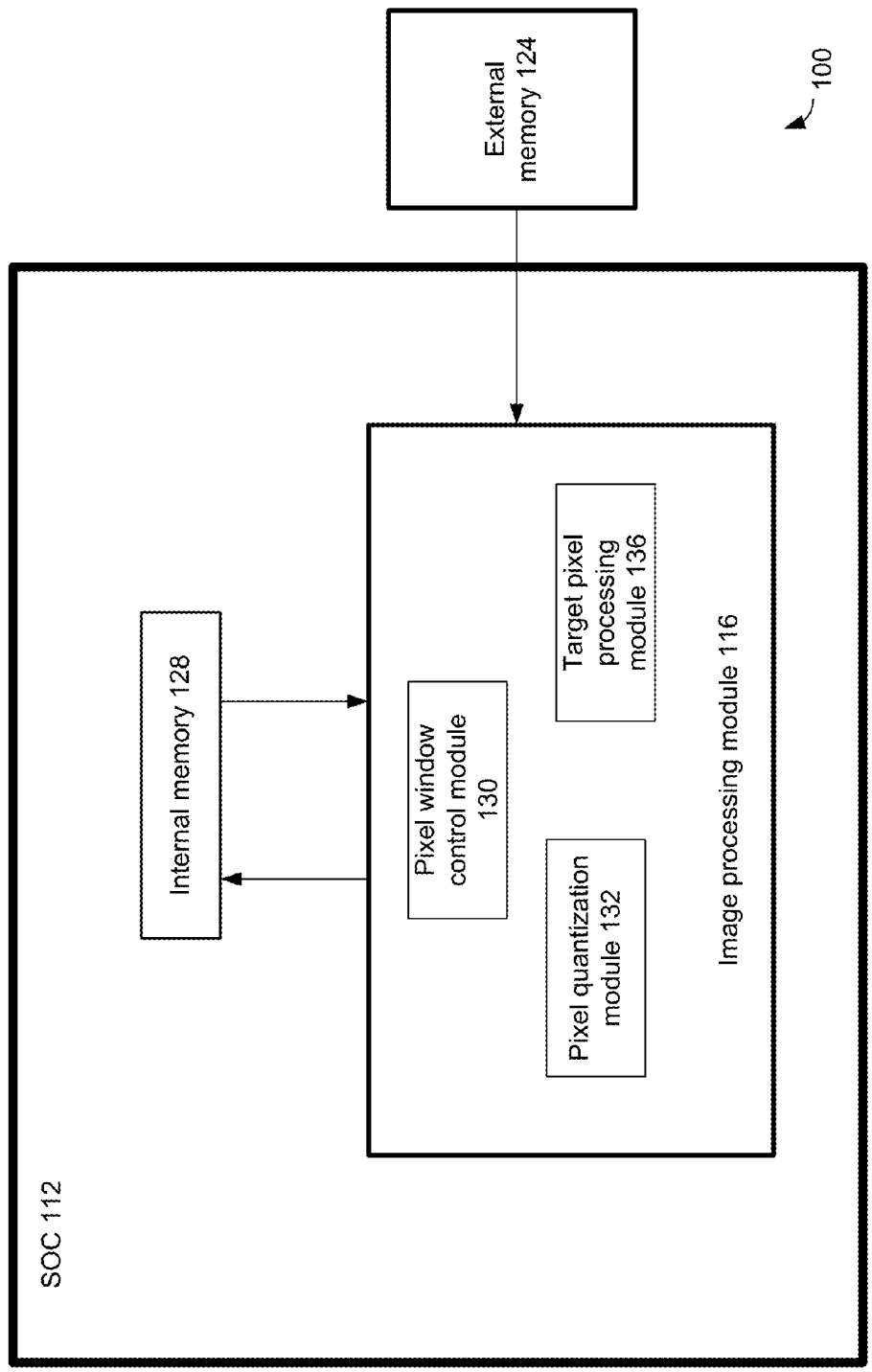
FIG. 1 illustrates an image processing system, in accordance with various embodiments of the present disclosure.

FIG. 1 illustrates an image processing system 100 (generally referred to herein as system 100), in accordance with various embodiments of the present disclosure. The system 100 includes a system-on-chip (SOC) 112 and an external memory 124 (e.g., which is external to the SOC 112). In various embodiments, the external memory 124 is a double data rate synchronous dynamic random access memory (DDR SDRAM), although the external memory 124 can be any appropriate type of memory.

The SOC 112 comprises an image processing module 116 and an internal memory 128. The internal memory 128 is, for example, a random access memory (RAM), e.g., a static random access memory (SRAM). The image processing module 116 comprises a pixel window control module 130, a pixel quantization module 132, and a target pixel processing module 136.

The system 100 (e.g., image processing module 116) is configured to process one or more images. For example, the SOC 112 is associated with any appropriate image processing system, e.g., a printing system, a display system, an image rendering system, and/or the like. Processing images, by the SOC 112, involves any appropriate type of image processing, e.g., generating halftone images, removing artifacts from the images, enhancing the images, rendering the images for printing or display, etc. In various embodiments, the SOC 112 performs intensity based image processing (e.g., trapping, sharpening, etc.) of one or more images.

Figure 2A:
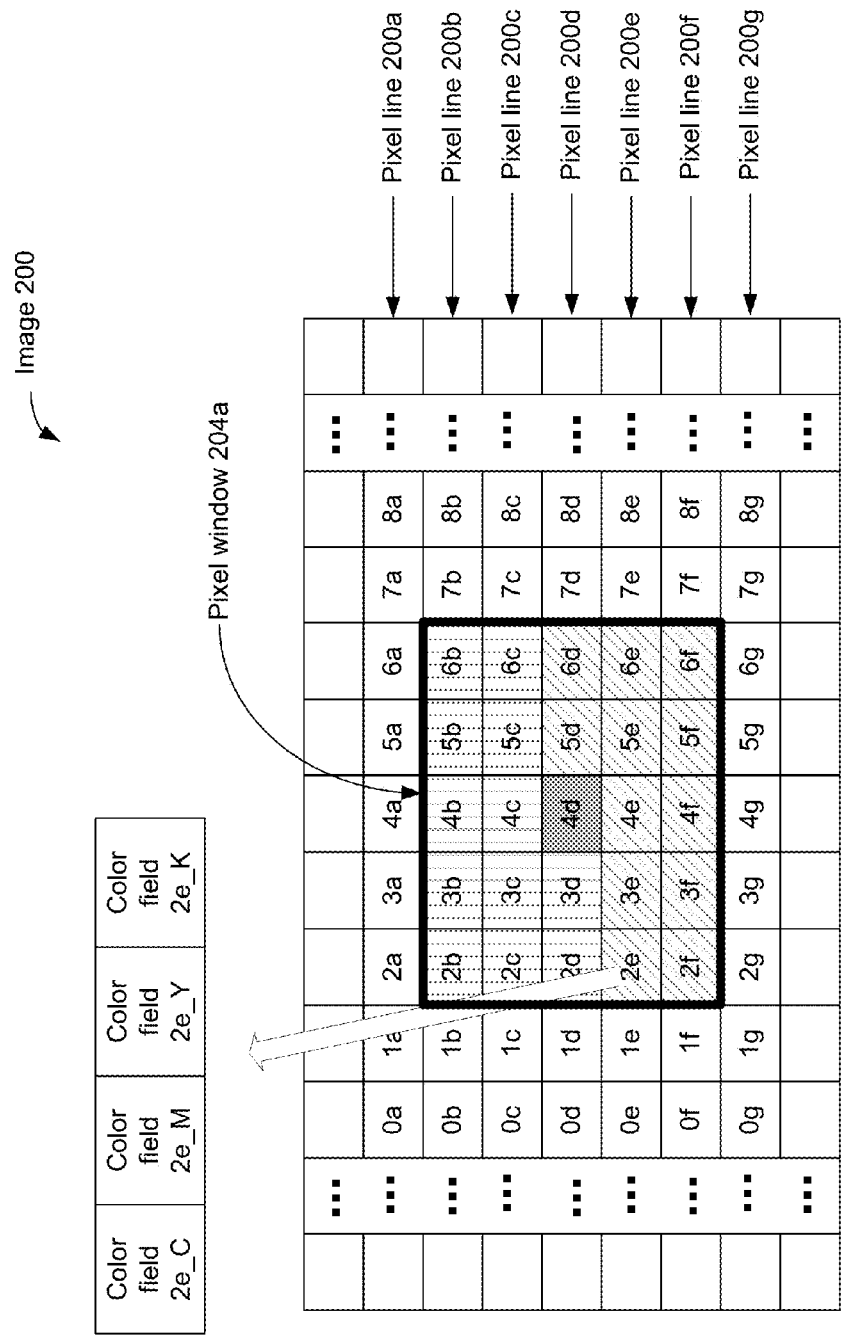
FIGS. 2a-2b illustrate an image that is processed by the image processing system of FIG. 1, in accordance with various embodiments of the present disclosure.

As an example, the system 100 is configured to process an image 200 illustrated in FIG. 2a. Referring to FIG. 2a, the image 200 has a plurality of horizontal pixel lines (generally referred to herein as pixel lines), each pixel line including a plurality of pixels. In FIG. 2a, seven example pixel lines are labeled as pixel lines 200a, . . . , 200g. Pixel line 200a includes a plurality of pixels, e.g., pixels 0a, . . . , 8a, pixel line 200b includes a plurality of pixels, e.g., pixels 0b, . . . , 8b, and so on, as illustrated in FIG. 2a. In various embodiments and as illustrated in FIG. 2a, the pixel lines 200a, . . . , 200g are consecutive pixel lines of the image 200 (e.g., there are no intervening horizontal pixel lines between the pixel lines 200a and 200b, between the pixel lines 200b and 200c, and so on). Although only a few pixel lines are illustrated in FIG. 2a, in various other embodiments, the image 200 can include any other number of pixel lines.

Referring to FIGS. 1 and 2a, the image processing module 116 processes various pixels of the image 200 from left to right, and from top to bottom, although such directions of processing of the pixels do not in any way limit the teachings of this disclosure. For example, the image processing module 116 processes pixels of the pixel line 200a, followed by pixel line 200b, and so on. Also, while processing a pixel line (e.g., pixel line 200a), pixels in the pixel lines are processed from left to right (e.g., pixels 0a, 1a, . . . , 255a are processed in that order).

For the purpose of this disclosure and unless otherwise mentioned, processing, accessing, writing, reading, storing and/or loading a pixel will imply processing, accessing, writing, reading, storing and/or loading, respectively, pixel information associated with the pixel (e.g., any appropriate information associated with the pixel). For example, writing pixel 0a in the internal memory 128 will imply writing information associated with the pixel 0a in the internal memory 128.

For the purpose of this disclosure and unless otherwise mentioned, a pixel line whose pixels are currently being processed by the image processing module 116 is referred to herein as a target pixel line, and a pixel that is currently being processed by the image processing module 116 is referred to herein as a target pixel. For example, in FIG. 2a, pixel line 200d is the target pixel line and the pixel 4d (illustrated in gray color) is the target pixel.

For certain types of image processing operations, while processing a target pixel, a window of pixels neighboring the target pixel is also accessed. For example, while the image processing module 116 processes the target pixel 4d for an image enhancement operation, a 5 by 5 pixel window 204 neighboring the target pixel 4d is also accessed by the image processing module 116. As illustrated, the pixel window 204 includes pixels 2b, . . . , 6b, 2c, . . . , 6c, 2d, 3d, 5d, 6d, 2e, . . . , 6e, and 2f, . . . , 6f. For the purpose of this disclosure and unless otherwise mentioned, pixels which are neighboring a target pixel line and which are included in a pixel window associated with the target pixel (e.g., a pixel window centered around the target pixel) are referred to herein as neighboring pixels of the target pixel. For example, pixels 2b, . . . , 6b, 2c, . . . , 6c, 2d, 3d, 5d, 6d, 2e, . . . , 6e, and 2f, . . . , 6f are neighboring pixels of the target pixel 4d.

Of the plurality of neighboring pixels of the pixel window 204a, some of the neighboring pixels (illustrated using vertical lines) have already been processed as a target pixel in the past and some of the neighboring pixels (illustrated using diagonal lines) are yet to be processed as a target pixel. For example, pixels 2b, . . . , 6b, 2c, . . . , 6c, 2d and 3d have already been processed as a target pixel in the past, and are illustrated using vertical lines in the pixel window 204a. Pixels 5d, 6d, 2e, . . . , 6e, and 2f, . . . , 6f are yet to be processed as a target pixel, and are illustrated using diagonal lines in the pixel window 204a.

Figure 2B:
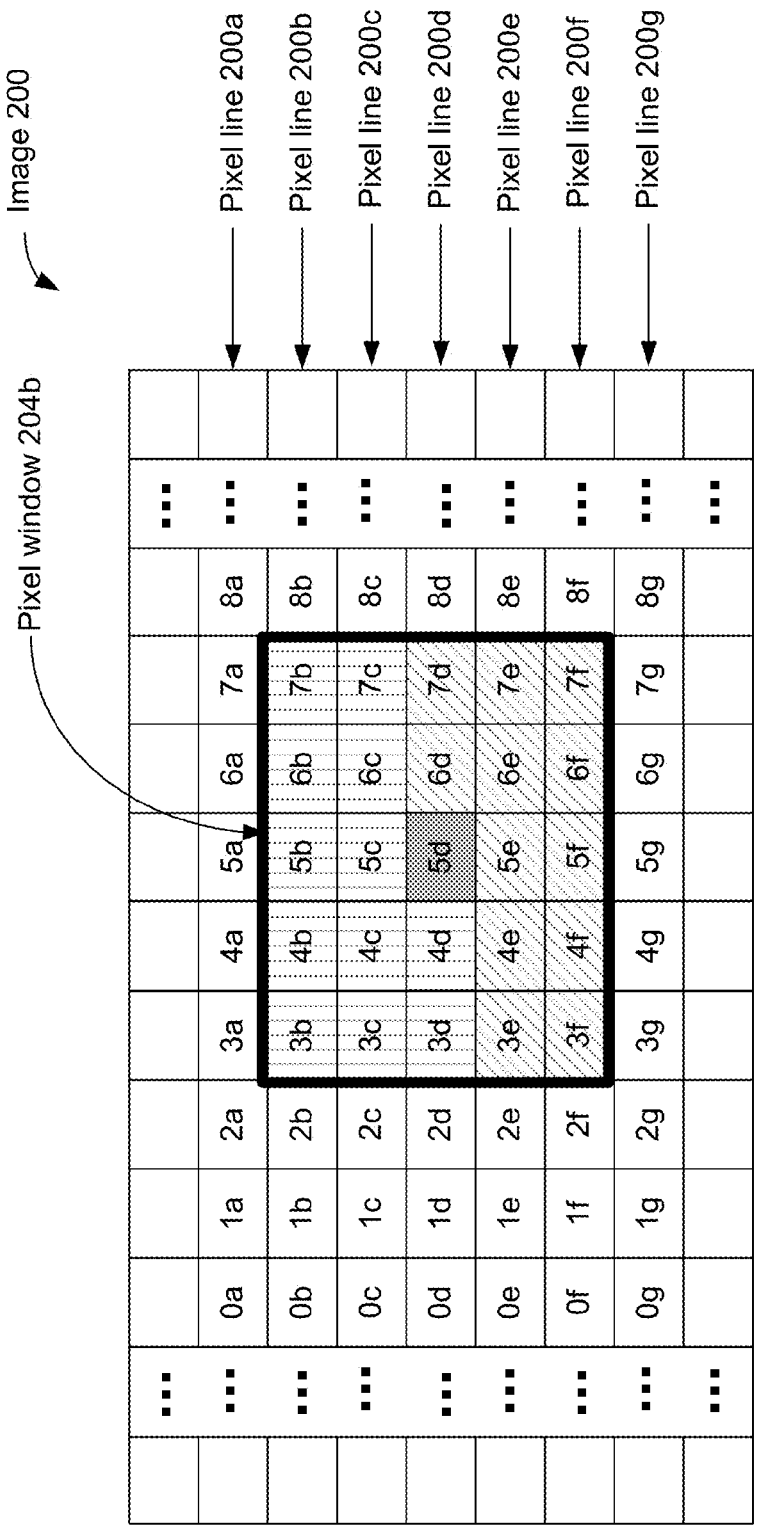

Once processing of the target pixel 4d is complete, another pixel is selected as a target pixel. As the target pixel shifts, so does the pixel window. For example, subsequent to processing the target pixel 4d of FIG. 2a, the image processing module 116 processes the target pixel 5d of the image 200, as illustrated in FIG. 2b. An associated pixel window 204b is also illustrated in FIG. 2b.

In various embodiments, each pixel of the image 200 is represented by a plurality of color planes. In an example, a CMYK color model, which includes cyan, magenta, yellow and key black color planes, is used for the image 200, and each pixel of the image 200 is represented by one or more of these color planes. Each pixel of the image 200 includes a plurality of color fields, each color field corresponding to a respective color plane (e.g., each pixel includes a cyan color field associated with the cyan color plane, a magenta color field associated with the magenta color plane, a yellow color field associated with the yellow color plane, and a black color field associated with the black color plane). In various other embodiments, any other appropriate color model (e.g., RGB) is used for the image 200.

As an example, various color fields of a pixel 2e is illustrated in FIG. 2a. As illustrated, pixel 2e includes color field $2e\_C$, color field $2e\_M$, color field $2e\_Y$, and color field $2e\_K$, which are associated with the cyan color plane, magenta color plane, yellow color plane, and black color plane, respectively, of the pixel 2e. In an example, each color field of a pixel has 8 bits, and accordingly, each pixel includes at least 32 bits (although in other embodiments, each color field of a pixel has any other appropriate number of bits).

In various embodiments, each color plane associated with a pixel contributes to an intensity of the pixel. For example, for a given pixel, the intensity contribution of individual color planes can be defined by a function that is used to convert the pixel to a grey scale image. For example, for a CMY color space, an intensity conversion function is given by:

$$I=(0.3*C)+(0.59*M)+(0.11*Y),\qquad\text{Equation (1),}$$

where C represents the cyan color plane of a pixel, M represents the magenta color plane of the pixel, Y represents the yellow color plane of the pixel, and I represents the intensity of the pixel. Thus, the cyan color plane contributes about 30% to the intensity of the pixel, magenta color plane contributes about 59% to the intensity of the pixel, and yellow color plane contributes about 11% to the intensity of the pixel.

As will be discussed in more detail herein later, in various embodiments, while processing a target pixel, various color fields of one or more neighboring pixels are quantized based on a contribution of individual color planes of the plurality of color planes towards an intensity of the image 200.

Figure 3:
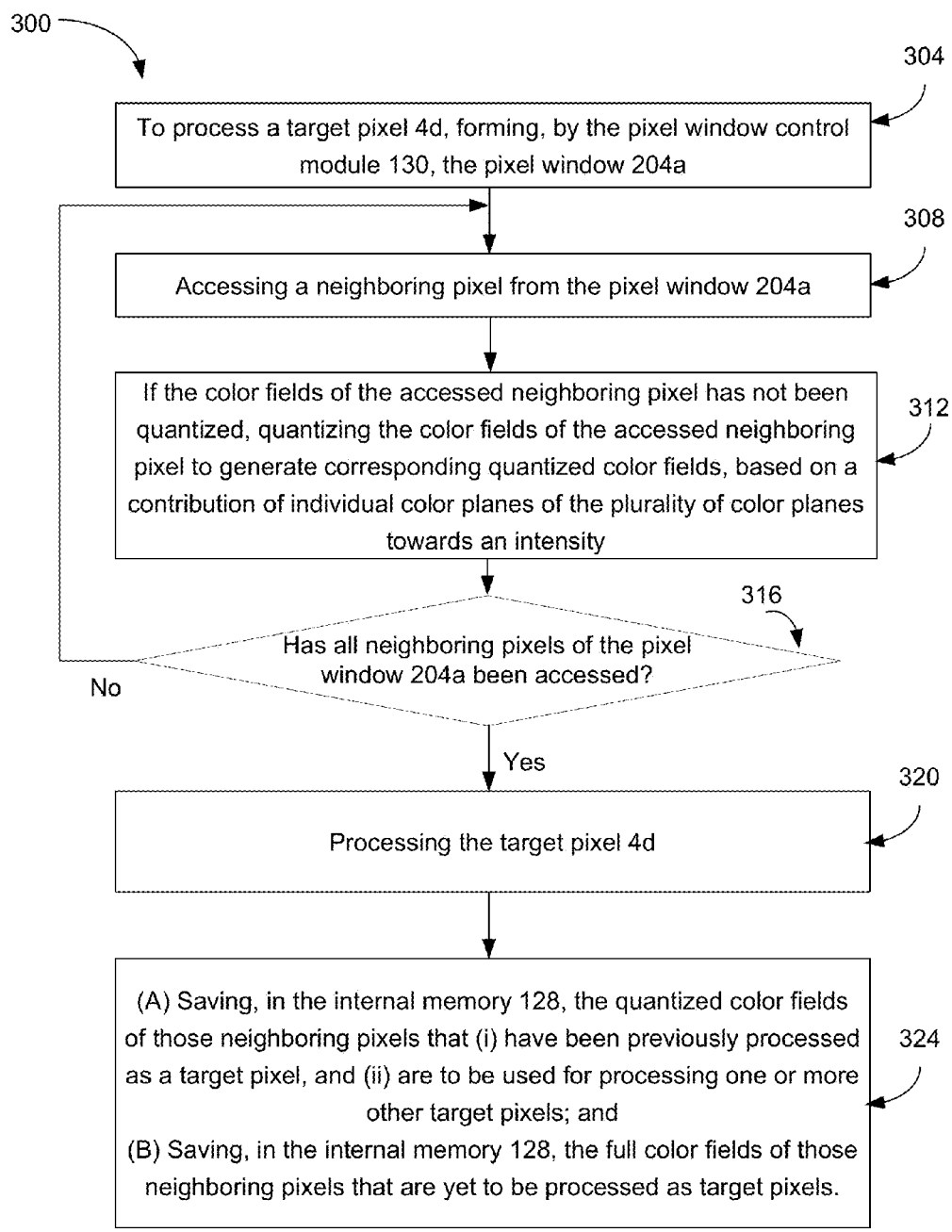
FIG. 3 is a flowchart describing a method for operating the image processing system of FIG. 1, in accordance with various embodiments of the present disclosure

FIG. 3 is a flowchart describing a method 300 for operating the system 100 of FIG. 1, in accordance with various embodiments of the present disclosure. Referring to FIGS. 1, 2a and 3, at 304, while processing the target pixel 4d, the pixel window control module 130 forms the pixel window 204a.

The processing of the target pixel 4d can involve any appropriate type of image processing operation of the target pixel 4d. In various embodiments, the processing of the target pixel 4d involves an intensity based image processing (e.g., trapping, sharpening, etc.) of the target pixel 4d. During processing of the target pixel 4d, an intensity of the target pixel 4d is selectively altered based on, for example, intensities of (i) the target pixel 4d and (ii) various neighboring pixels of the target pixel 4d.

In various embodiments, one or more pixels of one or more pixels lines of the image 200 are stored in the internal memory 128. For example, in various embodiments, one or more pixels of pixel lines 200b, . . . , 200e are stored in the internal memory 128 while processing the target pixel 4d. The pixel window control module 130 reads the pixels of these pixel lines from the internal memory 128 while forming the pixel window 204a. The pixel window control module 130 may also read one or more pixels of one or more pixels lines of the image 200 from the external memory 124 (or from any other appropriate storage location) while forming the pixel window 204a.

As previously discussed, each neighboring pixel in the pixel window 204a includes a plurality of color fields associated with a respective plurality of color planes. For example, each of the plurality of color fields of one or more pixels are 8 bits.

At 308, the pixel quantization module 132 accesses a neighboring pixel from the pixel window 204a. The color fields of the accessed neighboring pixel can be either quantized from a previous operation (e.g., while previously processing another target pixel, the accessed neighboring pixel with the quantized color fields was stored in the internal memory 128), or not quantized yet.

If various color fields of the accessed neighboring pixel has not been quantized before, at 312, the pixel quantization module 132 quantizes the plurality of color fields of the accessed neighboring pixel to generate a corresponding plurality of quantized color fields, based on a contribution of individual color planes of the plurality of color planes towards the intensity. For example, if the pixel 2e is accessed, color planes 2e_C, 2e_M, 2e_Y and 2e_K are quantized.

For example, as discussed with respect to equation 1, the cyan color plane contributes about 30% to the intensity, magenta color plane contributes about 59% to the intensity of the pixel, and yellow color plane contributes about 11% to the intensity of the various pixels of the image 200. Accordingly, the color fields 2e_C, 2e_M, 2e_Y and 2e_K of the accessed pixel 2e are quantized such that, for example, the quantization of the magenta color field is relatively more accurate compared to, for example, the quantization of the yellow color field (as the magenta color plane contributes relatively more to the intensity of the pixels compared to the yellow color plane).

As an example, each color field of each pixel before any quantization (also referred to as a full color field) is 8 bits. The color fields 2e_C, 2e_M, 2e_Y and 2e_K of the accessed pixel 2e are quantized such that, for example, the quantized color field corresponding to the cyan color plane is 4 bits, the quantized color field corresponding to the magenta color plane is 4 bits, the quantized color field corresponding to the yellow color plane is 3 bits, and the quantized color field corresponding to the black color plane is 5 bits, which approximately reflects contribution of various color planes towards the intensity. As an example, the cyan color field is quantized by deleting the four least significant bits (LSBs) of the 8 bit cyan color field, such that the quantized cyan color field comprises four most significant bits (MSBs) bits of the 8 bit cyan color field. Before the quantization process the various color fields of the pixel 2e comprises 32 bits, while after the quantization process the various quantized color fields of the pixel 2e comprises 16 bits only.

At 316, a check is performed to determine if all the neighboring pixels of the pixel window 204a has been accessed. If not, the operations at 308 and 312 are repeated. After all the neighboring pixels have been accessed, at 320 the target pixel 4d is processed by the target pixel processing module 136 using the quantized color fields of the neighboring pixels.

At 324, the pixel window control module 130 (and/or the pixel quantization module 132) saves, in the internal memory 128, the quantized color fields of those neighboring pixels that (i) have been previously processed as a target pixel, and (ii) are to be used (e.g., as neighboring pixels) for processing one or more other target pixels of the image 200. For example, in the pixel window 204a of FIG. 2a, the pixels that have been previously processed as a target pixel is labeled using vertical lines. Some of these pixels (e.g., pixel 3b) are not be used in future for processing one or more other target pixels of the image 200, and accordingly, in various embodiments, pixel 3b is not stored in the internal memory 128. In another example, pixel 4c has been previously processed as a target pixel, and is to be used as a neighboring pixel for processing one or more other target pixels of the image 200 (e.g., to be used as a neighboring pixel in the pixel window 204b of FIG. 2b). Accordingly, the quantized color fields of the pixel 4c is stored in the internal memory 128.

On the other hand, the pixel window control module 130 (and/or the pixel quantization module 132) saves, in the internal memory 128, the full color fields of those neighboring pixels that are yet to be processed as target pixels. The pixels (e.g., pixel 6d) that are yet to be processed as target pixels are labeled using diagonal lines in FIG. 2a. As these pixels are to be processed as target pixels in future, the full color fields of these pixels can be used while processing these pixels as target pixels (e.g., to improve an accuracy of processing). Accordingly, in various embodiments, the full color fields of these pixels are saved in the internal memory 128.

Although certain embodiments have been illustrated in FIG. 3, a wide variety of alternate embodiments may also be possible. For example, in various embodiments and although not illustrated in FIG. 3, in the method 300, quantized color fields of only those pixels, which have been previously processed as target pixels, may be used for processing the target pixel 4d (and full color fields of the pixels, which are yet to be processed as target pixels, may be used for processing the target pixel 4d). Various other alternatives may also be possible, as would be readily understood by those skilled in the art based on the teachings of this disclosure. For example, in an embodiment, color fields of all the neighboring pixels of the target pixel 4*d* is quantized and stored in the internal memory 128.

The image processing system 100 of FIG. 1, which performs intensity based quantization of various color fields of one or more pixels, has several advantages over a conventional image processing system. For example, as discussed with respect to the method 300, color fields of various neighboring pixels of the target pixel 4*d* are quantized based on a contribution of individual color planes towards the intensity. In various embodiments, such quantization is done while performing intensity based image processing (e.g., trapping, sharpening, etc.) of the target pixel 4*d*. As the quantization of the color fields of the neighboring pixels is based on the contribution of individual color planes towards the intensity, relative intensities of the neighboring pixels, with the quantized color fields, do not change significantly (at least, such a change may not be highly visually noticeable). Due to minimal change in the relative intensities of the neighboring pixels, the intensity based processing of the target pixel is not significantly affected. Furthermore, in an example, the quantized color fields of a pixel are 16 bits, which is significantly smaller in size than the full color fields of the pixel (which are 32 bits). This results in reduction in a storage space requirement for storing various color fields of the pixels (e.g., results in reduction in storage space requirement of the internal memory 128), and also results in a decrease in the processing power and/or associated hardware for processing various neighboring pixels while processing a target pixel.

In accordance with various embodiments, an article of manufacture may be provided that includes a storage medium having instructions stored thereon that, if executed, result in the operations described herein with respect to FIG. 3. In an embodiment, the storage medium comprises some type of non-transitory memory (not shown). In accordance with various embodiments, the article of manufacture may be a computer-readable medium such as, for example, software or firmware.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This application is intended to cover any adaptations or variations of the embodiments discussed herein. Therefore, it is manifestly intended that embodiments in accordance with the present disclosure be limited only by the claims and the equivalents thereof.

What is claimed is:

1. A method comprising:
    accessing a first pixel that is neighboring to a second pixel of an image, wherein the second pixel is to be processed as a target pixel, wherein the first pixel includes a plurality of color fields, and wherein each color field of the plurality of color fields of the first pixel is associated with a respective color plane of a plurality of color planes;
    determining whether the first pixel was previously processed as the target pixel; and
    performing at least one of
        (A) in response to determining that the first pixel was previously processed as the target pixel, (i) modifying the plurality of color fields of the first pixel to generate a corresponding plurality of modified color fields of the first pixel and (ii) based at least in part on the plurality of modified color fields of the first pixel, processing the second pixel as the target pixel, or
        (B) in response to determining that the first pixel was not previously processed as the target pixel, processing the second pixel as the target pixel based at least in part on the plurality of color fields of the first pixel.

2. The method of claim 1, further comprising:
    in response to determining that the first pixel was not previously processed as the target pixel, refraining from modifying the plurality of color fields of the first pixel prior to processing the second pixel as the target pixel.

3. The method of claim 2, further comprising:
    (i) in response to determining that the first pixel was not previously processed as the target pixel and (ii) subsequent to processing the second pixel as the target pixel, processing the first pixel as the target pixel; and
    subsequent to processing the first pixel as the target pixel, modifying the plurality of color fields of the first pixel to generate the corresponding plurality of modified color fields of the first pixel.

4. The method of claim 1, further comprising:
    determining whether the plurality of color fields of the first pixel was previously modified,
    wherein modifying the plurality of color fields of the first pixel further comprises
        in response to determining that (i) that the first pixel was previously processed as the target pixel and (ii) the plurality of color fields of the first pixel was not previously modified, modifying the plurality of color fields of the first pixel to generate the corresponding plurality of modified color fields of the first pixel.

5. The method of claim 1, further comprising:
    determining whether the plurality of color fields of the first pixel was previously modified; and
    in response to determining that (i) that the first pixel was previously processed as the target pixel and (ii) the plurality of color fields of the first pixel was previously modified, refraining from modifying the plurality of color fields of the first pixel.

6. The method of claim 1, wherein modifying the plurality of color fields of the first pixel to generate the corresponding plurality of modified color fields of the first pixel further comprises:
    quantizing the plurality of color fields of the first pixel to generate the corresponding plurality of modified color fields of the first pixel.

7. The method of claim 1, wherein:
    a first color field of the plurality of color fields of the first pixel includes N bits, where N is an positive integer; and
    modifying the plurality of color fields of the first pixel comprises
        quantizing the first color field of the plurality of color fields of the first pixel such that a corresponding modified first color field of the plurality of modified color fields of the first pixel comprises P most significant bits of the N-bit first color field, where P is a positive integer equal to or less than N.

8. The method of claim 1, wherein:
the plurality of color planes of the first pixel includes a first color plane and a second color plane;
the plurality of color fields includes (i) a first color field associated with the first color plane and (ii) a second color field associated with the second color plane;
the first color field and the second color fields are each N bits, where N is an positive integer; and
modifying the plurality of color fields of the first pixel further comprises
determining that a contribution of the first color plane is more than a contribution of the second color plane towards an intensity of the first pixel, and
in response to determining that the contribution of the first color plane is more than the contribution of the second color plane towards the intensity of the first pixel, quantizing the first color field and the second color field such that (i) a first modified color field corresponding to the first color field comprises P most significant bits of the first color field and (ii) a second quantized color field corresponding to the second color field comprises Q most significant bits of the second color field, wherein P and Q are positive integers not greater than N, and wherein P is greater than or equal to Q.

9. The method of claim 1, wherein:
the plurality of color planes includes a first color plane and a second color plane;
the plurality of color fields (i) includes a first color field associated with the first color plane and (ii) a second color field associated with the second color plane;
the first color field and the second color fields are each N bits, where N is an positive integer; and
modifying the plurality of color fields of the first pixel further comprises
determining that a contribution of the first color plane is more than a contribution of the second color plane towards the intensity, and
based on said determining, quantizing the first color field and the second color field such that an accuracy of quantizing the first color field is higher than an accuracy of quantizing the second color field.

10. The method of claim 1, wherein processing the second pixel as the target pixel comprises:
processing the second pixel as the target pixel to perform an intensity based image processing of the second pixel.

11. The method of claim 1, wherein the first pixel is neighboring the second pixel based at least in part on the first pixel being included in a pixel window that is centered around the second pixel.

12. A system configured to process an image comprising at least a first pixel and a second pixel, the system comprising:
a pixel window control module configured to form a pixel window around the second pixel of the image, wherein the second pixel is to be processed as a target pixel, wherein the first pixel is included in the pixel window, wherein the first pixel includes a plurality of color fields, and wherein each color field of the plurality of color fields of the first pixel is associated with a respective color plane of a plurality of color planes;
a quantization module configured to (i) determine whether the first pixel was previously processed as the target pixel, and (ii) in response to determining that the first pixel was previously processed as the target pixel, modify the plurality of color fields of the first pixel to generate a corresponding plurality of modified color fields of the first pixel; and
a target pixel processing module configured to (i) in response to the first pixel being previously processed as the target pixel, process the second pixel as the target pixel based at least in part on the plurality of modified color fields of the first pixel, or (ii) in response to the first pixel not being previously processed as the target pixel, process the second pixel as the target pixel based at least in part on the plurality of color fields of the first pixel.

13. The system of claim 12, wherein the quantization module is further configured to:
in response to determining that the first pixel was not previously processed as the target pixel, refrain from modifying the plurality of color fields of the first pixel prior to processing the second pixel as the target pixel.

14. The system of claim 12, wherein:
the target pixel processing module is further configured to (i) in response to the first pixel not being previously processed as the target pixel and (ii) subsequent to processing the second pixel as the target pixel, process the first pixel as the target pixel; and
the quantization processing module is further configured to subsequent to the processing of the first pixel as the target pixel, modify the plurality of color fields of the first pixel to generate the corresponding plurality of modified color fields of the first pixel.

15. The system of claim 12, wherein the quantization processing module is further configured to:
determine whether the plurality of color fields of the first pixel was previously modified; and
in response to determining that (i) that the first pixel was previously processed as the target pixel and (ii) the plurality of color fields of the first pixel was not previously modified, modify the plurality of color fields of the first pixel to generate the corresponding plurality of modified color fields of the first pixel.

16. The system of claim 12, wherein the quantization processing module is further configured to:
determine whether the plurality of color fields of the first pixel was previously modified; and
in response to determining that (i) that the first pixel was previously processed as the target pixel and (ii) the plurality of color fields of the first pixel was previously modified, refrain from modifying the plurality of color fields of the first pixel.

17. The system of claim 12, wherein the quantization processing module is further configured to modify the plurality of color fields of the first pixel to generate the corresponding plurality of modified color fields of the first pixel by:
quantizing the plurality of color fields of the first pixel to generate the corresponding plurality of modified color fields of the first pixel.

18. The system of claim 12, wherein a first color field of the plurality of color fields of the first pixel includes N bits, where N is an positive integer, and wherein the quantization processing module is further configured to modify the plurality of color fields of the first pixel by:
quantizing the first color field of the plurality of color fields of the first pixel such that a corresponding modified first color field of the plurality of modified color fields of the first pixel comprises P most significant bits of the N bit first color field, where P is a positive integer equal to or less than N.

19. The system of claim 12, wherein the target pixel processing module is configured to process the second pixel as the target pixel by:
   processing the second pixel as the target pixel to perform an intensity based image processing of the second pixel.

20. The system of claim 12, wherein the first pixel is included in the pixel window based at least in part on the first pixel being a neighboring pixel to the second pixel.

* * * * *